Sept. 19, 1939.　　　J. M. SCHMIED　　　2,173,730
PERFORATING MACHINE
Filed March 1, 1937　　　6 Sheets-Sheet 1
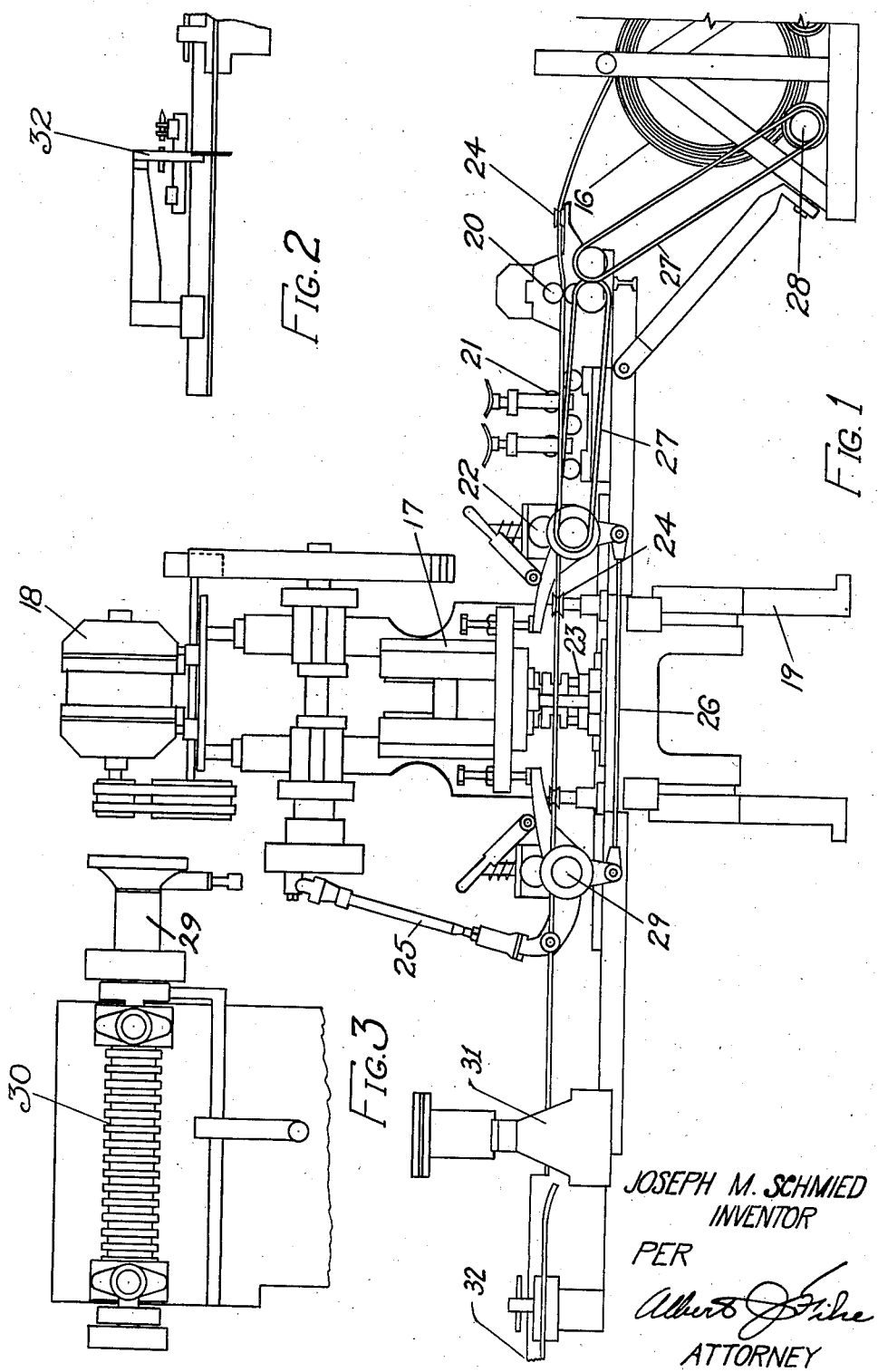
JOSEPH M. SCHMIED
INVENTOR
PER
ATTORNEY Sept. 19, 1939.　　　J. M. SCHMIED　　　2,173,730
PERFORATING MACHINE
Filed March 1, 1937　　　6 Sheets-Sheet 2

JOSEPH M. SCHMIED
INVENTOR
PER
ATTORNEY

Sept. 19, 1939.   J. M. SCHMIED   2,173,730
PERFORATING MACHINE
Filed March 1, 1937   6 Sheets-Sheet 3
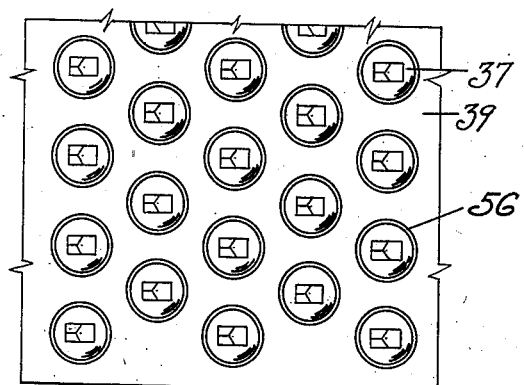
Fig. 8
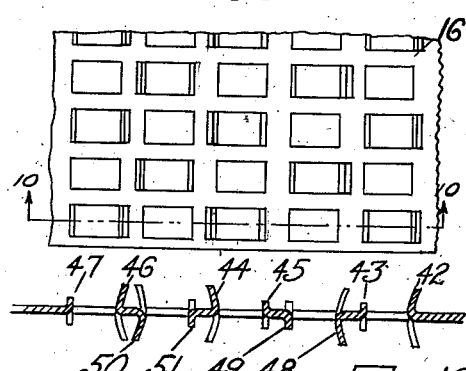
Fig. 9
Fig. 10
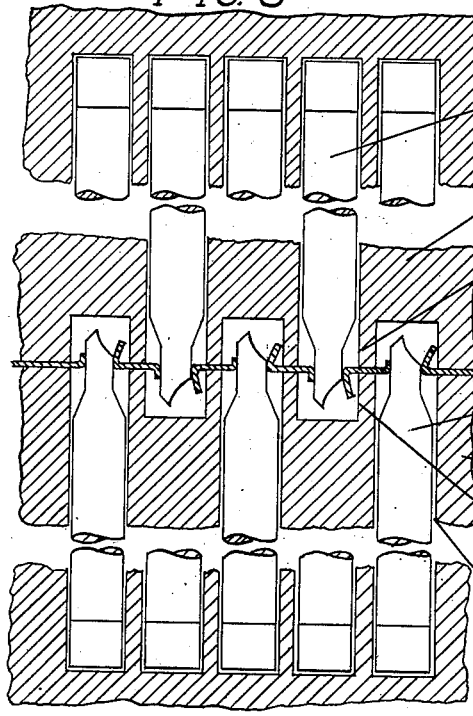
Fig. 6
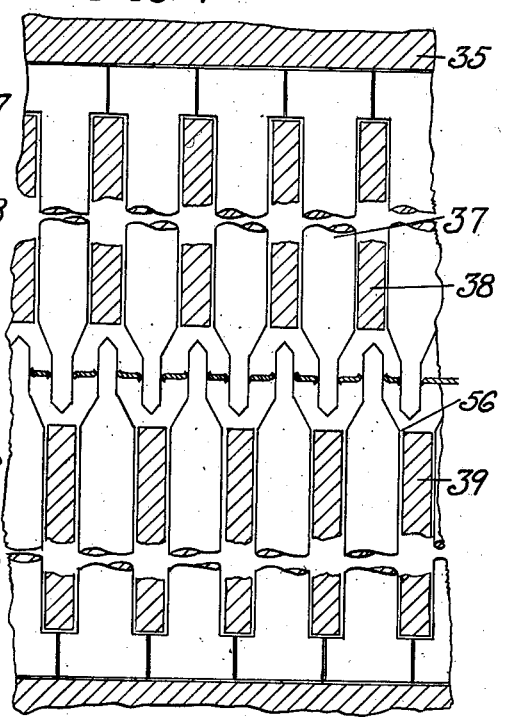
Fig. 7
JOSEPH M. SCHMIED
INVENTOR
PER
ATTORNEY

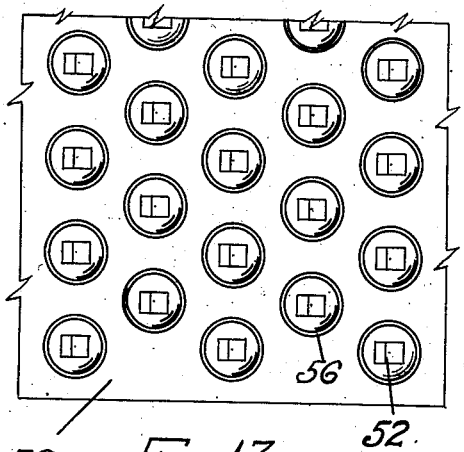
Fig. 13
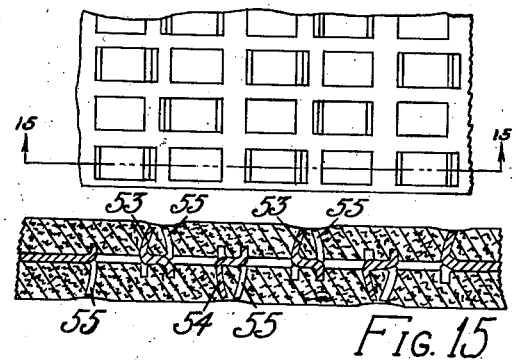
Fig. 14
Fig. 15
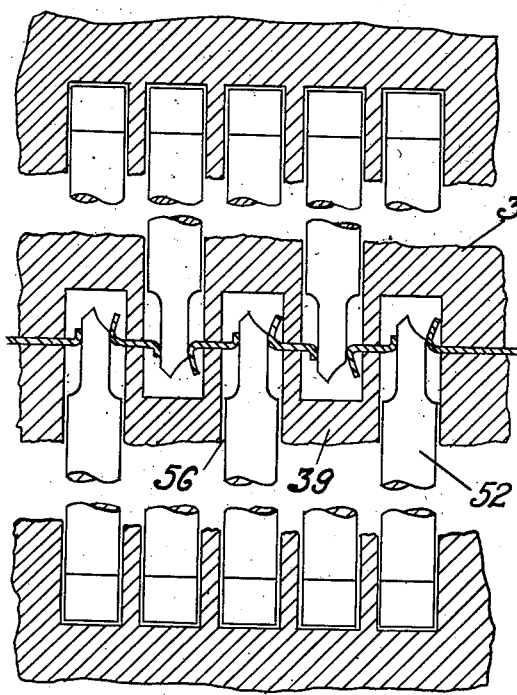
Fig. 11
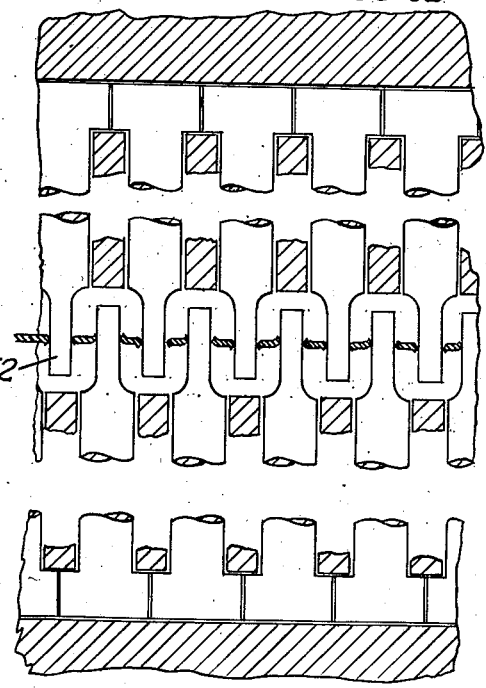
Fig. 12
JOSEPH M. SCHMIED
INVENTOR

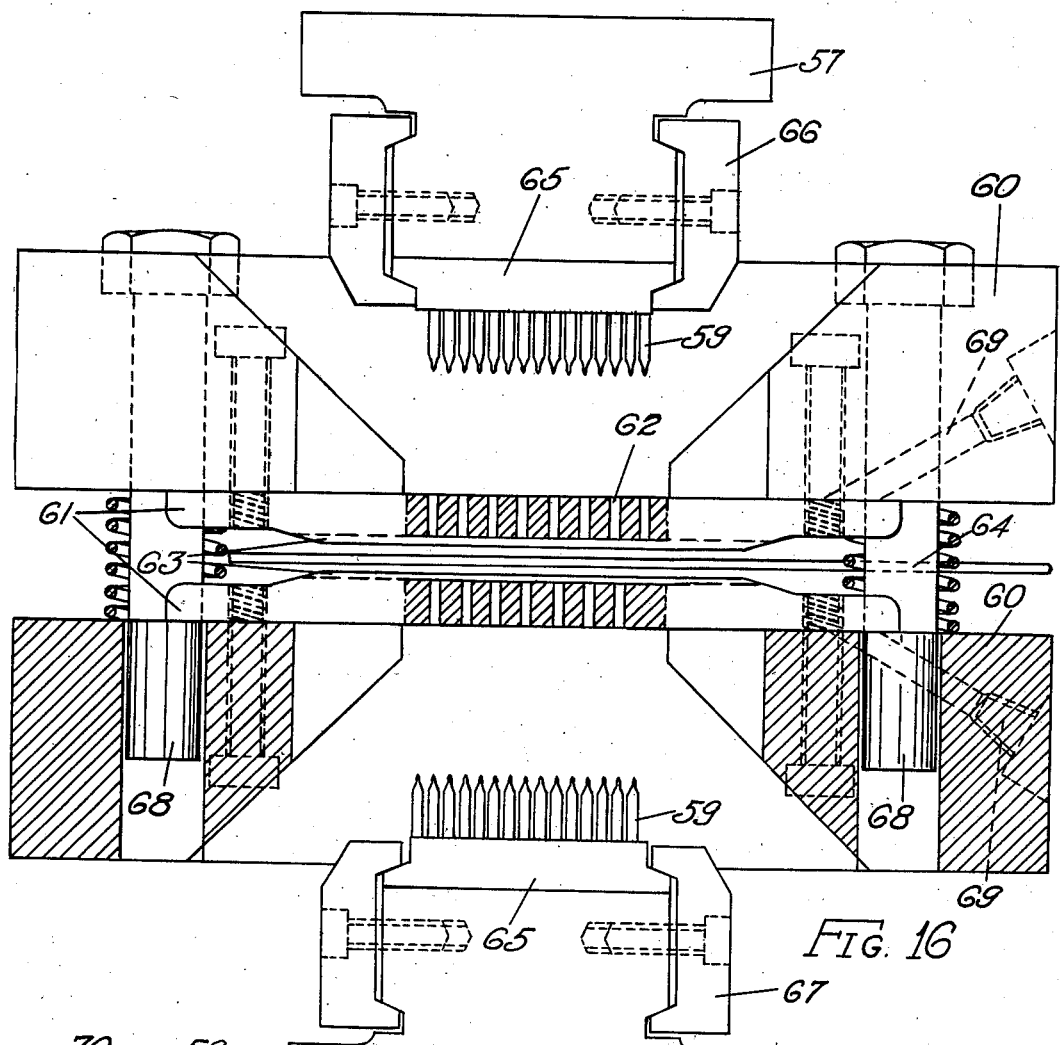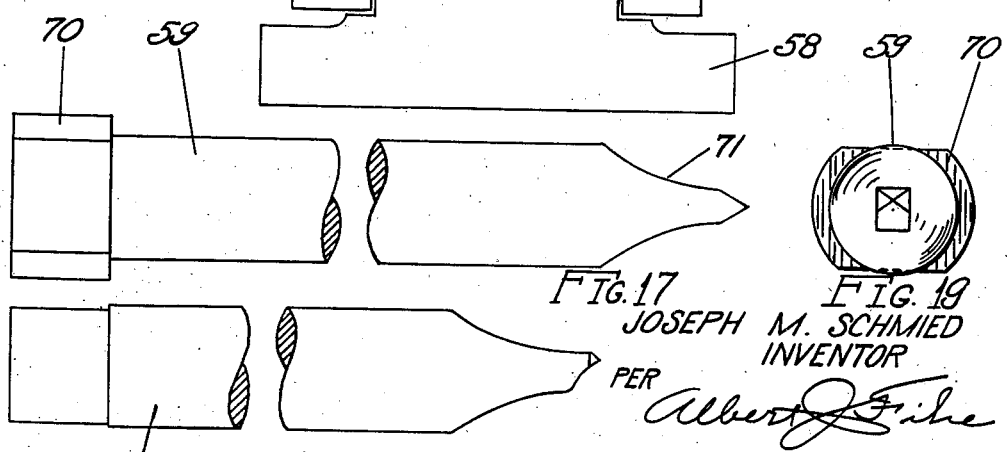

JOSEPH M. SCHMIED
INVENTOR

PER

ATTORNEY

Patented Sept. 19, 1939

2,173,730

UNITED STATES PATENT OFFICE 2,173,730

PERFORATING MACHINE

Joseph M. Schmied, Chicago, Ill., assignor to Victor Manufacturing & Gasket Company, Chicago, Ill., a corporation of Illinois Application March 1, 1937, Serial No. 128,449

5 Claims. (Cl. 164—90)

This invention relates to an improved perforating machine, and has, for one of its principal objects, the provision of a novel and useful device for perforating sheet metal, particularly such as is employed as reinforcements for asbestos layers used in the production of gaskets.

One of the principal objects of this invention is to provide, in a single machine, means for preliminarily straightening and flattening the sheet metal as it comes from the rolls, means for perforating the same to produce a plurality of tangs extending from both sides of the sheet in desired spaced relation to each other, further means for again flattening the sheet while, at the same time, maintaining the tangs at a desired height and of a required contour, and final means for automatically trimming and severing the perforated sheet into sections of a desired size.

Another important object of the invention is to provide a perforating machine which distinguishes in many ways from the rotary cutting devices which have heretofore been employed, the perforations being made by a plurality of punch elements which are simultaneously passed into and through the sheet metal from both faces thereof.

A still further object of the invention is to provide, in a perforating machine for sheet metal, means for producing a variety of perforations and resultant tang while, at the same time, enabling the size, contour and relationship of the tangs and openings to be changed throughout a number of combinations whereby the sheets of asbestos, which are later applied to the perforated metal, will be more firmly and properly gripped and held in position thereon.

Other and further important objects of the invention will be apparent from the disclosures in the accompanying drawings and following specification.

The invention, in a preferred form, is shown in the drawings and hereinafter more fully described.

In the drawings:

Figure 1 is a front elevation of the improved perforating machine of this invention, showing the progress of the sheet metal to be perforated therethrough.

Figure 2 is a detail view of one end of the machine, illustrating the automatic cut-off mechanism.

Figure 3 is a top plan view of the grooved roller which finishes the perforated sheet.

Figure 6 is an enlarged side elevation, partly in section, of the perforating elements, including the punches and their holders, and showing the action on the metal sheet.

Figure 7 is an end view of the apparatus shown in Figure 6.

Figure 8 is an enlarged top view of the lower perforating element with the punches therein.

Figure 9 is an enlarged view of the perforated metal sheet.

Figure 10 is a sectional view taken on the line 10—10 of Figure 9, looking in the direction indicated by the arrows.

Figure 11 is a view similar to Figure 6, illustrating a slight modification of the invention.

Figure 12 is a side view of the structure of Figure 11.

Figure 13 is a top plan view of the lower perforating element of Figure 11.

Figure 14 is an enlarged view of the product of the perforating elements shown in Figures 11, 12 and 13.

Figure 15 is a sectional view taken on the line 15—15 of Figure 14, showing the insert in a completed gasket.

Figure 16 is a detail view, partly in section, of a modified form of perforating element.

Figure 17 is a side view of an improved type of punch used with the device of Figure 16.

Figure 18 is a side view of the same punch viewed when rotated through an angle of 90°.

Figure 19 is an end view of the punch of Figures 17 and 18.

As shown in the drawings:

Figure 4:
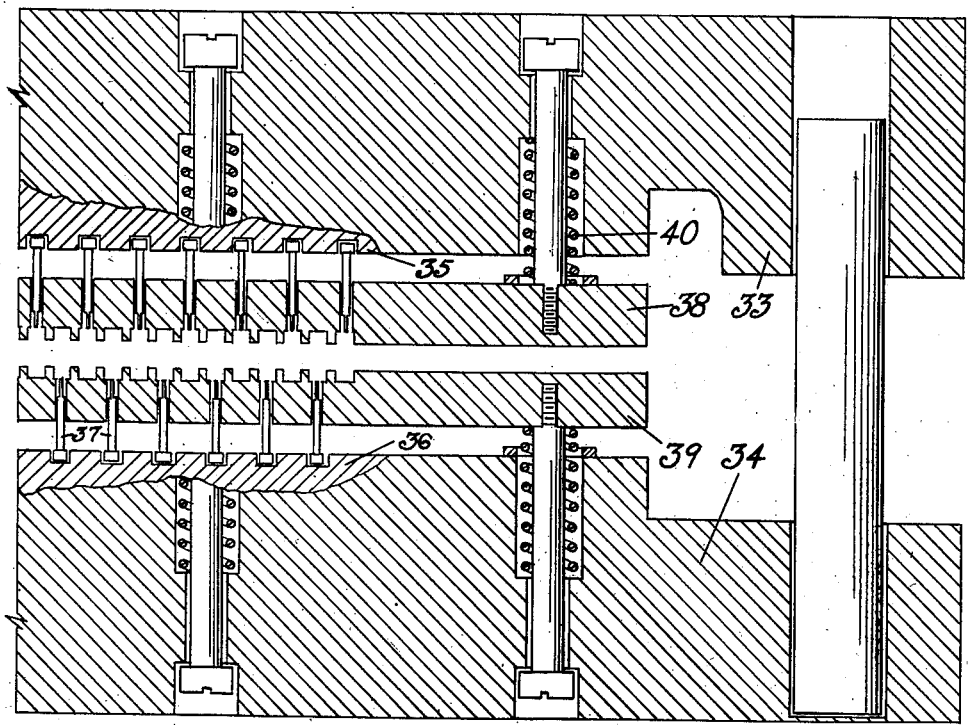
Figure 4 is a detail view, partly in section and in approximately actual size, illustrating the perforating elements and their action.

The reference numeral 16 indicates generally a roll of sheet metal from which the product of this invention is made in the improved machine. The machine itself includes a punch press structure 17 operated by a motor 18 and supported on a frame 19.

The sheet of metal coming off the roll 16 is first passed through an oiling device 20 and thence into a straightening device which includes a series of rollers 21, which device also takes out any kinks or wrinkles which may be in the sheet metal. The sheet is then passed to a feeder 22 which operates in progressive steps by means of a one-way clutch mechanism. The sheet then goes to the dies or perforating elements 23 wherein a section of the metal is perforated completely across its width by passing a plurality of punches therethrough from both sides thereof. Guides 24 are provided at intervals in order to assure that the metal strip or sheet is always maintained in its proper path through the machine.

The feeding motion is accomplished by means of links 25 and 26 and also by belts or chains 27 driven by the press and connected to the one-way clutch mechanism, the oiler and the supports 28 for the roll 16.

At 29 in Figure 1 and in more detail in Figure 3 is illustrated finishing rollers through which the perforated sheet of metal passes, these rollers being provided with grooves 30 to allow the burrs or tangs to pass therethrough without undue flattening but which, at the same time, will assure that none of the tangs project beyond a maximum predetermined distance from the face of the sheet.

The trimming mechanism which removes any unperforated material from the edges of the sheet is provided at 31, and an automatic cut-off to cut the completed sheet into rectangular plates is also included in the machine, part of this automatic sheet cutting device being illustrated at 32 in Figure 1, and the major portion of the same being better shown in Figure 2. This automatic cut-off is simply a shear or knife and can be operated in any desired or convenient manner as by a mercury switch tripped by the punching movement and connected to a source of compressed air supply for operating the shears or in any other desired mode. Such switches are shown in United States Patent Numbers 705,250 and 1,562,596.

In Figure 4, a more detailed view of the perforating elements is presented, these including top and bottom plates 33 and 34 respectively and also top and bottom holders 35 and 36 respectively for the punches 37. It will be noted that the punches, while being positioned in the holders 35 and 36, pass through perforated plates 38 and 39 respectively, the plate 39 being shown in top view in Figure 5. Coil springs 40 are provided to normally maintain the parts in position as shown in Figure 4.

The perforated plates 38 and 39 act as stripper plates, the material to be punched passing therebetween, and the punches 37 being slidably operative through the openings 56 in the stripper plates 38 or 39.

Figure 5:
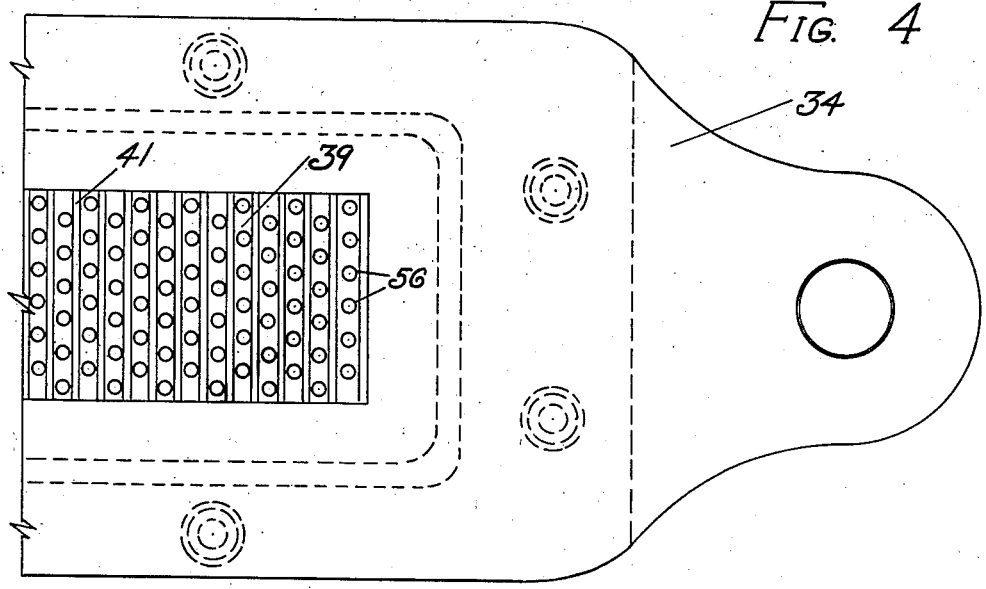
Figure 5 is a top plan view of the lower perforating element.

It will be noted from an inspection of Figures 4 and 5 that the punch elements 37 are alternately spaced with regard to each other and that the openings in the elements 38 and 39, through which they pass, are in staggered alignment, each line of openings being positioned between two parallel ridges 41 which are formed integral with the material of the plate 38 or 39 as the case may be.

Figure 21:
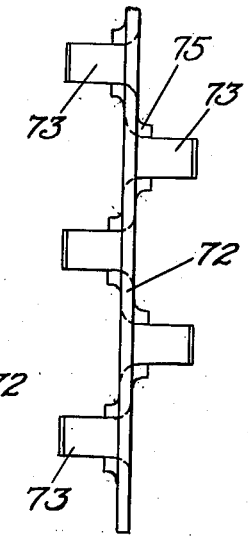
Figure 21 is an end view of the material of Figure 20.
Figure 22:
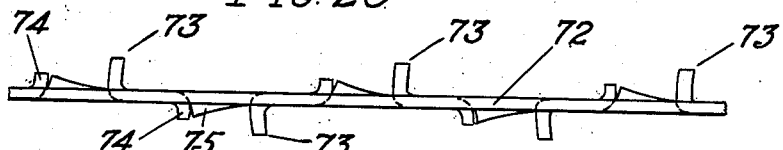
Figure 22 is a side view of the material.

The ridges 41 on the stripper plates, in addition to helping to grip the material to be perforated, also prevent deformation of the same when the perforations and resultant prongs are being made, assuring a flat sheet without any undesirable hillocks or protuberances adjacent the perforated openings as best shown in Figures 10, 21 and 22.

This construction is shown in considerable enlargement in Figures 6 to 8 inclusive, Figures 6 and 7 illustrating in complete detail the action of the punches and their supporting elements when the same are forced together against the tension of the springs 40 by means of the punch press structure 17. It will be noted that the sheet of metal 16 is held between the juxtaposed ridges 41 of the plates 38 and 39, and that the punches 37 pass therethrough from both sides thereof forming projections or tangs of desired contour and with a predetermined relationship to each other.

In Figure 7, the perforating elements are shown as again separated and also looking at the punches from a direction at right angles to the showing of Figure 6, the punches in this case being sharpened at their upper edges to produce a desired type of perforation or cut in the sheet metal.

Figures 9 and 10 show the product of the perforating elements of Figures 6 to 8 inclusive, and it will be noted that the perforations themselves are substantially rectangular and that, in each case, the punch strikes up a long tang at one end of the hole and a shorter tang at the other end, while short side portions are also struck up or down as the case may be, this last being evident from an inspection of Figure 7.

The punches themselves may be positioned in their holders 35 and 36 in any desired relationship to each other so as to produce varius combinations of spaced long and short prongs. For example, as shown in Figure 10, the punch, which makes the opening in the lower right-hand corner of the sheet of Figure 9, produces a long tang 42 at the right-hand end of the opening and a shorter tang 43 at the left-hand end of the opening. The next punch, which comes up through the bottom, produces a long tang 44 at the left end of the opening and a short tang 45 at the right end of the opening. This is again reversed in the case of the opening at the left-hand end of the showing wherein the long prong or tang 46 is at the right-hand end and the shorter prong 47 at the left-hand end. The same effect is achieved in the case of the prongs which extend downwardly from the sheet; namely, in the first row of downward openings, the one at the right has a long prong 48 at the right-hand end of the opening and a short prong 49 at the left end of the opening, this condition being reversed in the case of the next perforation which has a long prong 50 at the left end of the opening and a short prong 51 at the right end of the opening. This arrangement, together with similar staggering in the next row of perforations, produces a structure wherein two long prongs are often practically back to back which results in a better gripping of the asbestos sheet when the same is applied to the perforated metal sheet and then run through rollers to clinch the upturned prongs or tangs down into the body of the asbestos. This is all done preferably without penetrating completely through the layer of asbestos as it has been found by experience that a better gripping and retaining action is provided if the prongs or tangs are embedded or clinched in the body of the asbestos itself without projecting to the surface thereof.

Further modifications of the punches are illustrated in Figures 11, 12 and 13, the punches 52 of these figures having only one cutting edge as distinguished from the sharpened points of the punches 37 shown in Figures 6 to 8 inclusive. The action produces a different type of cut and also, in some instances, a more pronounced rearward bend in the prongs or tangs as will be evident from an inspection of Figures 14 and 15.

In this case, a different arrangement of the cutting faces or edges of the punches is provided whereby the long prongs 53 are all at the right-hand ends of the upwardly punched openings while similar long prongs 54 are also at the right-hand ends of the downwardly punched openings in the first line of openings. This condition is reversed in the next line of openings wherein the long prongs 55 are at the left-hand end of the openings in the perforations from both top and bottom. Obviously, the arrangement of the punches may be changed to produce quite a wide variety of combinations and any desired arrangement of upwardly and downwardly extending prongs or tangs so that the best possible gripping action is provided so far as the asbestos sheet is concerned.

In Figure 16 is illustrated a slightly different form of perforating apparatus wherein two opposed heads 57 and 58, each supporting a plurality of punch elements 59 are mounted so as to be impelled toward each other and through combined sheet metal supporting elements 60 and stripper plates 61. The stripper plates are provided with openings 62 through which the punch elements pass and are also provided with opposed ridges 63 whereby the sheet of metal therebetween is securely gripped at the time of perforation. As in the previously described device, the punching proceeds in steps, a certain area of the metal sheet 64 being perforated by the described action, whereupon a further area is advanced into the device, each perforated area being closely adjacent the preceding one. It will be noted that the elements 65 which separate the punches themselves are removably mounted in the heads 57 and 58, this being accomplished by means of clamp structures 66 and 67 respectively. It will be further noted that the elements 60, which support the stripper plates 61, are held in aligned relationship by means of bolts or the like 68, which bolts are fixedly mounted in the upper element 60 and slidably positioned in suitable openings in the lower element. A suitable means for spraying oil or some other lubricant upon the sheet of metal is provided as shown by the dotted lines at 69, thereby eliminating, to a great degree, possibilities of breakage of the punches during the operation. A preferred form of punch is illustrated in the enlarged views of Figures 17 to 19 inclusive, the same being preferably provided with a base 70 by means of which they are suitably positioned in the holders 65, and it will be noted that the penetrating end 71 is slightly different than the corresponding ends of the punches shown in Figures 4, 6, 7, 11 and 12, whereby a slightly different form of perforated material is obtained.

Figure 20:
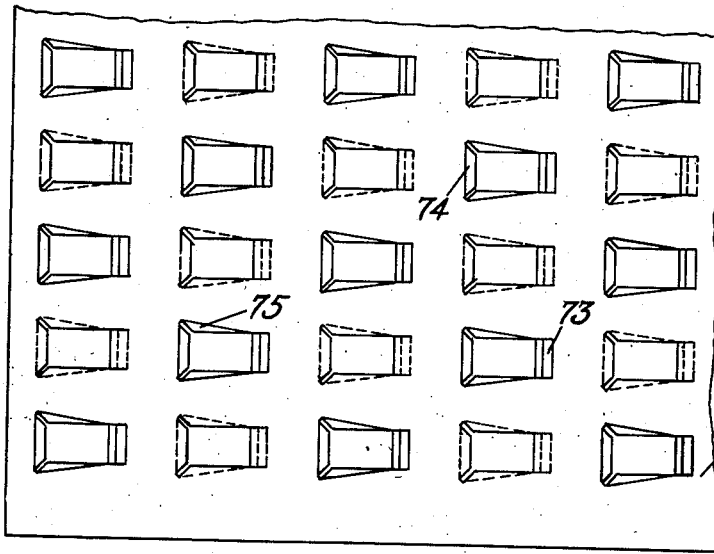
Figure 20 is a top plan view of the product of the perforating device of Figure 16.

This material is illustrated in enlarged detail at 72 in Figures 20, 21 and 22, and it will be noted that each of the openings made in the sheet by means of the punches 59 is rectangular, having a long prong 73 struck either upwardly or downwardly as the case may be, these long prongs being in one end of the opening, and opposed to the long prong is a relatively short prong 74 likewise on the same side of the sheet, but due to the action of the punches, the prongs are turned away from each other, the long prongs particularly being bent rearwardly to a noticeable extent.

Side elements 75 are also punched out of the material adjacent the openings, these being of relatively small extent but sufficient to assist in the gripping action so far as the application of a layer of fibrous material thereto is concerned.

Figure 23:
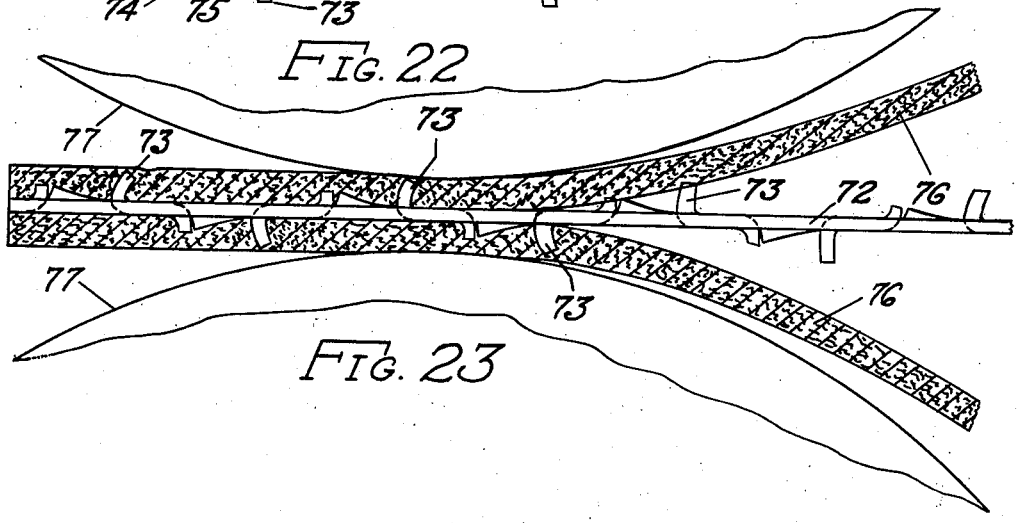
Figure 23 is a detail view, partly in section, showing the action of assembling the asbestos or other fibrous material into the perforated material of Figures 20, 21 and 22.

In Figure 23 is illustrated a preferred form of applying layers of fibrous material such as asbestos or the like 76 to the perforated sheet, this being done by means of opposed rollers 77 spaced a desired distance apart, and the action of the rollers in fastening the fibrous sheets into the metallic reinforcement is illustrated in enlarged detail.

It will be noted that the long prongs 73 in each instance first penetrate the asbestos or other fibrous material, and then by means of the action of the rollers, are bent downwardly into clinching relationship, and the positioning and action of the rollers is such that these clinched prongs will be entirely beneath the surface of the asbestos or other fibrous material after the rolling and clinching operation has been completed. This is because the fibrous material is, of course, much more resilient than the metal and will be compressed to a greater degree by the action of the rollers 77 during the clinching operation while, at the same time, it will, on account of its resiliency, again expand to a greater extent than will the metal prongs 73, and in most instances, will, during this expansion, completely cover any portion of the metal prong which may have penetrated to the surface of the asbestos, thereby providing a completed sheet which has no metallic points visible or detectable on its surface, while, at the same time, a desired clinching relationship is provided. The elimination of metal contact on the surface of material such as this is quite desirable, particularly when the same is used in the manufacture of gaskets used in internal combustion engines or the like, because a metal to metal contact in the use of such gaskets or packings is much to be avoided. Furthermore, the fact that the metal prongs are bent rearwardly and are completely embedded in the material of the fibrous layers themselves affords a much more resilient structure whereby a much better packing action is obtained when the device is applied in a motor, particularly in places where a very efficient sealing action is desired such as between the cylinder head and block.

It will be evident that herein is provided a novel form of perforating machine which is especially adapted for the simple, economical and practical preparation of metal sheets used in the production of gaskets of the class described, and many important advantages will at once be apparent. One of the main points to be considered in a structure of this type is that, in the event of the breaking of a punch, the same can be very conveniently and readily replaced, while, in machines of the rotary type, the breaking of a single tooth immediately required the disassembling of the entire machine and the insertion of a complete new rotary cutter having quite a number of teeth, all of which entailed considerable delay and expense. The present device can obviously be made to accommodate any desired width of sheet metal, and, furthermore, can be practically continuously operated in a step-by-step movement while, at the same time, the arrangement of the resultant tangs or projections struck up from the openings can be varied to achieve many changed conditions.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A perforating device, comprising two opposed supporting plates, a plurality of punches mounted in each plate, and a stripper plate associated with each supporting plate, each stripper plate provided with a plurality of openings through which the punches pass, together with a plurality of channels forming ridges on the working face of each stripper plate.

2. A perforating device, comprising two opposed supporting plates, a plurality of punches mounted in each plate, and a stripper plate associated with each supporting plate, each stripper plate provided with a plurality of openings through which the punches pass, together with a plurality of channels forming ridges on the working face of each stripper plate, the ridges being interposed between aligned series of openings.

3. A perforating device, comprising two opposed supporting plates, a plurality of punches mounted in each plate, and a stripper plate associated with each supporting plate, each stripper plate provided with a plurality of openings through which the punches pass, together with a plurality of parallel material gripping ridges on the working face of each stripper plate.

4. An apparatus for manufacturing perforated metal inserts, comprising a pair of opposed supports spaced away from but movable toward each other, a perforated stripper plate spring held on each support, a plurality of material gripping ridges integral with each stripper plate, and a plurality of punching elements mounted in associated relationship but separable from the supports, said punching elements adapted to pass through openings in the stripper plates for a punching operation, means for forcing the punch supporting elements toward each other in intermittent steps, and, at the same time, also forcing the stripper plates and associated parts toward each other, and means between the stripper plates for normally maintaining the same spaced away from each other.

5. An apparatus for manufacturing perforated metal inserts, comprising a pair of opposed supports spaced away from but movable toward each other, a perforated stripper plate on each support, a plurality of material gripping ridges integral with each stripper plate, the ridges being between lines of perforation to allow entry of punch ends, and a plurality of punching elements mounted in the supports, said punching elements adapted to pass through openings in the stripper plates for a punching operation, and means for forcing the punch supporting elements toward each other in intermittent steps, and, at the same time, also forcing the stripper plates and associated parts toward each other, and means between the stripper plates for normally maintaining the same spaced away from each other a distance sufficient for the free and loose passage of a sheet of material to be perforated therethrough.

JOSEPH M. SCHMIED.